2 Sheets
Sheet 2

J. M. & M. L. Kellar.
Harvester Rake.

Nº 69679. Patented Oct. 8, 1867.

Witnesses:
Theo Tusiche
Wm Trewrn

Inventor
James M Kellar
Martin L Kellar
Per Mimms
Attorneys

UNITED STATES PATENT OFFICE.

JAMES M. KELLAR AND MARTIN L. KELLAR, OF BUCKEYE, IOWA.

IMPROVEMENT IN HARVESTERS.

Specification forming part of Letters Patent No. 69,679, dated October 8, 1867.

*To all whom it may concern:*

Be it known that we, JAMES M. KELLAR and MARTIN L. KELLAR, of Buckeye, in the county of Benton and State of Iowa, have invented a new and Improved Harvester; and we do hereby declare that the following is a full, clear, and exact description thereof, which will enable others skilled in the art to make and use the same, reference being had to the accompanying drawings, forming part of this specification.

This invention relates to a new and improved harvester, of that class provided with a horizontal rotary cutting-wheel; and it consists in a peculiar construction and arrangement of parts, as hereinafter fully shown and described, whereby several advantages are obtained, which will be hereinafter set forth.

Figure 1:
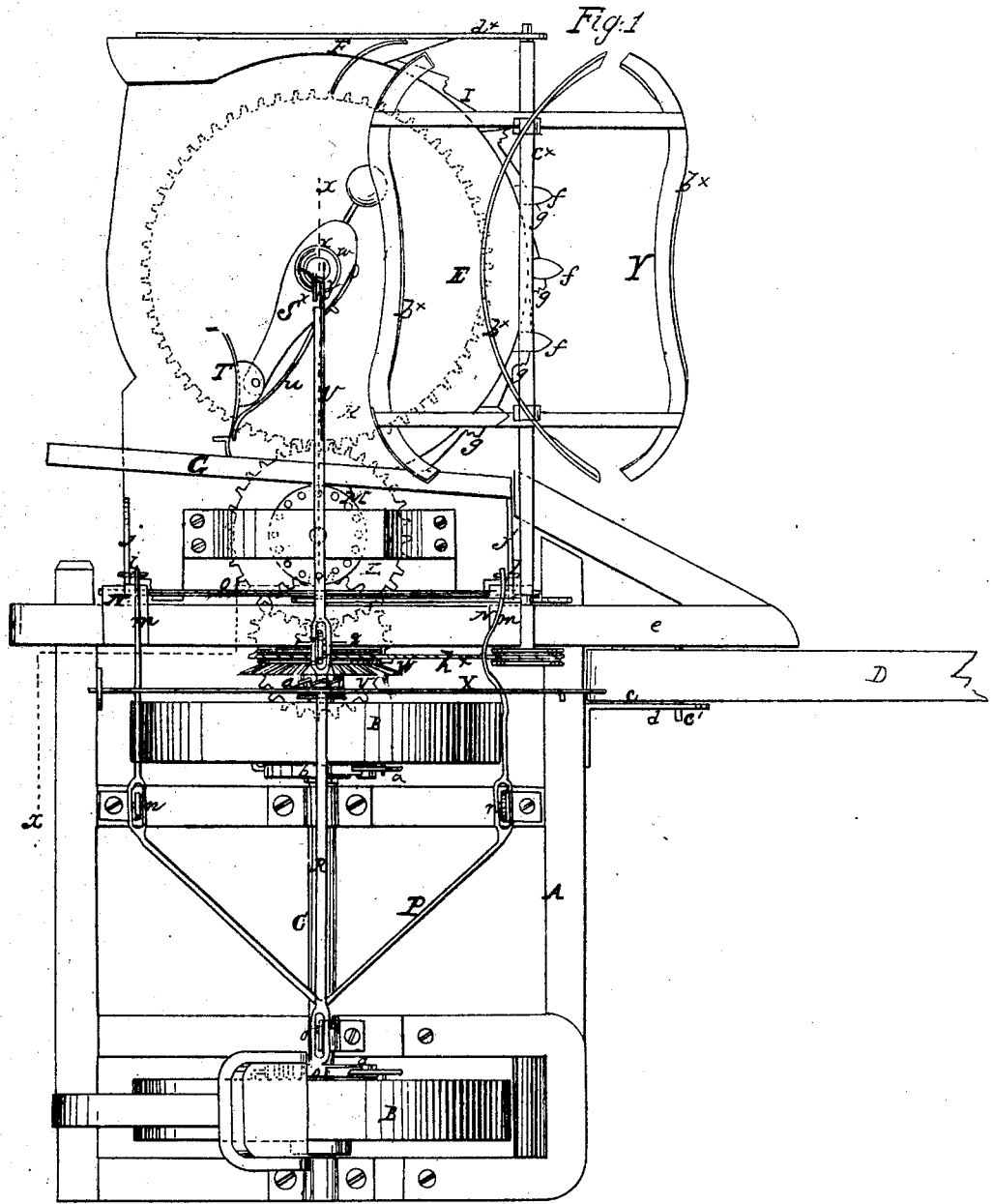
Figure 2:
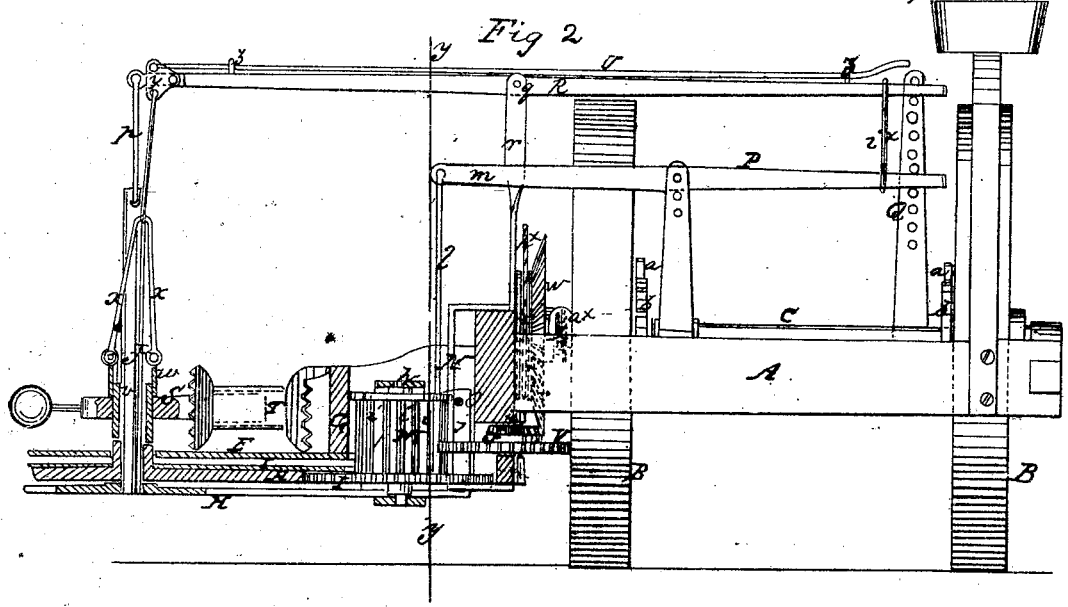
Figure 3:
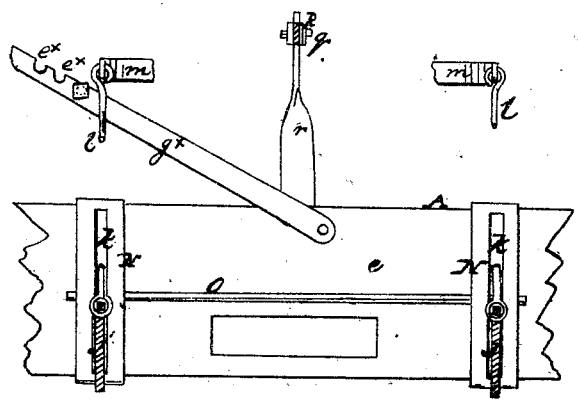

In the accompanying drawings, Figure 1, Sheet No. 1, is a plan or top view of our invention; Fig. 2, Sheet No. 2, a longitudinal vertical section of the same, taken in the line $x\ x$, Fig. 1; Fig. 3, a transverse vertical section of the same, taken in the line $y\ y$, Fig. 2.

Similar letters of reference indicate like parts.

A represents the main frame of the machine, which is mounted on two wheels, B B, said wheels being placed loosely on their axle C, and connected therewith by pawls $a$ and ratchets $b$, so arranged as to cause the wheels, when the machine is drawn forward, to rotate the axle, but not to return the latter when the machine is "backed." This arrangement is substantially the same as that now applied to the generality of harvesters. D represents the draft-pole, the rear end of which is secured, by pins $c\ c'$, between a plate, $d$, at the front end of the main frame and a projecting side piece, $e$, thereof, the rear pin $c$ passing through any of a series of holes in the plate $d$, and the projecting end of the side piece $e$, according to the height required for the outer end of the draft-pole. E represents the grain-platform, the front part of which is of semicircular form, and has a grain-divider or track-cleaner, F, attached to its left-hand or outer side, and a bar, G, secured to its inner side. (See Fig. 1.) To the under sides of the divider or track-cleaner F and the bar G a circular plate, H, is attached, to the front part of which there are secured fingers or guards $f$, through which the teeth $g$ of the circular cutter I work. This cutter is underneath the platform E, between it and the finger-plate H, and it is fitted loosely on a fixed standard or arbor, J, which passes up through the grain-platform E. The circular cutter I is attached to a toothed wheel, K, which gears into a wheel, L, on the lower end of a shaft, $h$, the bearings of which are connected to the part of the finger-plate H between the bar G and the side $e$ of the main frame, and on the same shaft $h$ there is keyed or otherwise secured a pinion, M, the teeth of which are composed of cylindrical rods $i$, of considerable length or height, as shown clearly in Fig. 2. The finger-plate H, at its inner side, adjoining the main frame A, has two vertical lips, $j\ j$, one at its front and the other at its rear, and these lips fit in slots $k$, made in plates N N, attached to the outer side of the side $e$ of the main frame, the upper parts of said lips, behind the plates N N, having a rod, O, passing through them. (See Fig. 3.) Each lip $j$ is connected, by a rod, $l$, with the ends $m\ m$ of a forked lever-frame, P, the fulcrum of which is at $n\ n$, the opposite end of said frame being formed with an eye, $o$, through which a standard, Q, on the main frame A passes. The upper end of the fixed arbor or standard J is connected, by a link, $p$, with one end of a lever, R, the fulcrum-pin $q$ of which passes through the upper part of a standard, $r$, on the main frame, and the opposite end of this lever has an opening or eye made in it for the standard Q to pass through. The wheel K is provided with a hub, $s$, which extends up through the grain-platform E, and has its upper edge provided with ratchet-teeth, to engage with similar teeth on a tube, $t$, which is placed loosely on the standard J above the hub $s$, and to the tube $t$ there is attached a horizontal arm, S, having a rake, T, pivoted to its outer end, with a spring, $u$, bearing against it. To the tube $t$, above the arm S, there is attached, by a swivel-connection, $v$, a tube, $w$, which is suspended by rods $x\ x$ from a bell-crank, $y$, attached to the lever R, and this bell-crank has a rod, U, connected to it, which passes through guides $z\ z$ on the lever R. (See Fig. 2.) V is a wheel fitted in the side $e$ of the main frame A. This wheel gears into the pinion M, and on the axis of the wheel V there is a bevel-pinion, $f^*$, into which a bevel-wheel, W, gears, the latter being placed loosely on the axle C of the main frame A, and connected to it, when desired, by a clutch, $a^*$, operated by a lever, X. (See Fig. 1.) Y represents the reel, the beaters $b^*$ of which are of curved form, to correspond to the curvature of the front part of the grain-platform and sickle. The journals of the shaft $c^*$ of the reel are fitted, one in any of a series of holes in the upper part of an inclined bar, $d^*$, attached to the divider or track-clearer F, and the other journal fitted in any of a series of notches, $e^*$, in the upper end of an inclined bar, $g^*$, attached to the side $e$ of the main frame. The reel is driven by a belt, $h^*$, from the axle C. The lever R and lever-frame P are connected by a link, $i^*$. (See Fig. 2.)

The operation is as follows: As the machine is drawn along, the circular cutter I is rotated from the axle C through the medium of the gearing W $f^*$ V M L K, and the cut grain falls upon the platform E, the reel Y performing its usual work. The cut grain is raked from the platform by the rake T, the rake-arm S being rotated owing to the clutch connection of the tube $t$ with the hub $s$ of wheel K. The platform E and cutting apparatus may be raised at any time, in order to clear obstructions, by depressing the right-hand end of the lever-frame P or the lever R, both moving simultaneously in consequence of the connection formed by the link $i^*$. By adjusting the lever-frame P and lever R, and securing them at a higher or lower point by a pin passing through the standard Q, the cutter may be adjusted to cut higher or lower, as required, and the rake may be raised independently and rendered inoperative at any time by actuating the rod U. The platform E and cutting apparatus may, by removing the lever R and detaching the reel Y, be turned up to a vertical position, the lips $jj$ and rod O serving as a joint or hinge.

Having thus described our invention, we claim as new and desire to secure by Letters Patent—

1. The circular cutter I and finger-plate H, arranged in connection with a grain-platform, E, and attached to the main frame A, substantially as shown and described, to admit of being raised or lowered, or turned up to a vertical position, as set forth.

2. The horizontal revolving rake-arm S, with rake T attached, and arranged and applied as shown, to admit of being rotated from the hub of wheel K, and raised and lowered either simultaneously with or independently of the grain-platform and cutting apparatus, substantially as shown and described.

3. The lever R and lever-frame P, attached, respectively, to the standard J and lips $jj$, and arranged and combined as shown, for raising and lowering the cutting apparatus.

4. The placing of the rake-arm S on the standard J, and connecting it with the hub $s$ of the wheel K, and with the rod U and bell-crank $y$, as shown, to admit of the rake being rendered operative and inoperative at any time when desired.

JAMES M. KELLAR.
MARTIN L. KELLAR.

Witnesses:
THOMAS N. DODD,
HENRY HARRISON.